US00RE41193E

(19) United States
(12) Reissued Patent
Nishi et al.

(10) Patent Number: US RE41,193 E
(45) Date of Reissued Patent: Apr. 6, 2010

(54) METHOD FOR FABRICATING A PRISM AND METHOD FOR FABRICATING AN OPTICAL SYSTEM

(75) Inventors: Kazuyuki Nishi, Sakai (JP); Yuichiro Ori, Moriyama (JP); Tomokazu Taguchi, Osaka (JP); Kazunari Tada, Hachioji (JP)

(73) Assignee: Konica Minolta Opto, Inc., Hachioji-shi (JP)

(21) Appl. No.: 11/726,406

(22) Filed: Mar. 21, 2007

Related U.S. Patent Documents

Reissue of:
(64) Patent No.: 6,870,694
Issued: Mar. 22, 2005
Appl. No.: 10/715,898
Filed: Nov. 18, 2003

(30) Foreign Application Priority Data

Mar. 18, 2003 (JP) ..... 2003-073163
Jul. 25, 2003 (JP) ..... 2003-201467

(51) Int. Cl.
*G02B 5/04* (2006.01)

(52) U.S. Cl. ..... 359/833; 369/112.28
(58) Field of Classification Search ..... 359/831–837
See application file for complete search history.

(56) References Cited

U.S. PATENT DOCUMENTS 5,483,362 A * 1/1996 Tai et al. ..... 359/1
6,005,835 A 12/1999 Tsuji et al. ..... 369/112
6,556,532 B2 4/2003 Ogawa et al. ..... 369/112.16

FOREIGN PATENT DOCUMENTS

JP 6-331807 A 12/1994
JP 9-265655 A 10/1997
JP 10-143901 A 5/1998
JP 2001-118279 A 4/2001
JP 2001-344845 A 12/2001

OTHER PUBLICATIONS

Japanese "Notification of Reasons for Refusal" (along with a translation) dated Aug. 8, 2005 for counterpart Japanese Patent Application No. 2003–201467 in which the following references are cited in the order that they appear.

* cited by examiner

*Primary Examiner*—Euncha P Cherry
(74) *Attorney, Agent, or Firm*—Sidley Austin LLP

(57) ABSTRACT

A method for fabricating a prism that comprises a first and a second substrate, both translucent, bonded together with an optical thin film interposed at the interface in between and that is used with the interface inclined relative to the optical axis of incident laser light of a wavelength of 420 nm or shorter includes the step of bonding together the first and second substrates of which the difference ΔN1 in refractive index at the wavelength of the laser light fulfills the condition: $\Delta N1 \leqq |1/(0.3\times10^4\times NA\times t)|$, where t represents the thickness of the first and second substrates cemented together as measured along the optical axis of the laser light, and NA represents the numerical aperture of the incident laser light.

32 Claims, 4 Drawing Sheets

METHOD FOR FABRICATING A PRISM AND METHOD FOR FABRICATING AN OPTICAL SYSTEM

Matter enclosed in heavy brackets [ ] appears in the original patent but forms no part of this reissue specification; matter printed in italics indicates the additions made by reissue.

This application is based on Japanese Patent Application Nos. 2003-73163 and 2003-201467 filed on Mar. 18, 2003 and Jul. 25, 2003, respectively, the contents of which are hereby incorporated by reference.

BACKGROUND OF THE INVENTION

1. Field of the Invention

The present invention relates to a method for fabricating a prism and a method for fabricating an optical system that employs a prism. More particularly, the present invention relates to a method for fabricating a prism and an optical system through which blue light of wavelengths of 420 nm or shorter (in the 405 nm band) is passed.

2. Description of the Prior Art

In an optical disk apparatus for recording and reproducing signals to and from an optical disk such as a DVD, writing and reading of signals are achieved by the use of light of different wavelengths according to the type of medium. U.S. Pat. No. 6,005,835 and other patent publications disclose constructions for reading signals from different types of optical disks by the use of a single optical pickup. FIG. 1 is a diagram showing the construction of such an optical pickup.

The optical pickup 1 has a first light source 2 that emits light of a first wavelength and a second light source 3 that emits light of a second wavelength. The light of the first wavelength is, for example, light in the 650 nm band (red light). This permits reading of signals from a disk D when the disk D is a DVD-ROM. The light of the second wavelength is, for example, light in the 780 nm band (infrared light). This permits reading of signals from the disk D when the disk D is a CD-ROM.

In the optical paths of the light emitted from the first and second light sources 2 and 3, there is disposed a dichroic mirror 5 that reflects the light of the first wavelength and that transmits the light of the second wavelength. Thus, the light emitted from the first light source 2 is directed to the disk D by being reflected from the dichroic mirror 5, and the light emitted from the second light source 3 is directed to the disk D by being transmitted through the dichroic mirror 5.

Between the dichroic mirror 5 and the disk D, there are disposed a prism 8, a collimator lens 4, a quarter-wavelength plate 10, a diffraction grating 7, and a condenser lens 11. The prism 8 is composed of translucent substrates 8a, 8b, and 8c bonded together, and these translucent substrates 8a, 8b, and 8c have surfaces inclined relative to the optical path.

At the interface between the substrates 8a and 8b, there is provided a PBS (polarizing beam splitter) film 8d that transmits P-polarized light and that reflects S-polarized light. At the interface between the substrates 8b and 8c, there is provided a BS (beam splitter) film 8e that reflects part of the light incident thereon and that transmits the remainder thereof.

The collimator lens 4 shapes the light, a divergent beam, coming from the first and second light sources 2 and 3 into a parallel beam. The quarter-wavelength plate 10 shifts the phase of the light by λ/4. The light emitted from the first and second light sources 2 and 3 passes through the quarter-wavelength plate 10 twice, i.e., before striking the disk D and after being reflected therefrom. Thus, the phase of the light is shifted by λ/2, with the result that P-polarized light is converted into S-polarized light.

The diffraction grating 7 is a hologram or the like, and varies the focus position of the condenser lens 11 according to the wavelength of the light. The condenser lens 11 focuses the light of the first and second wavelengths on the disk D. In the reflecting and transmitting directions of the BS film 8e, there are disposed light-receiving devices 12 and 13 such as photodiodes, respectively.

In the optical pickup 1 constructed as described above, the P-polarized light of the first wavelength emitted from the first light source 2 is reflected from the dichroic mirror 5 and is thereby directed to the prism 8. The P-polarized light of the second wavelength emitted from the second light source 3 is transmitted through the dichroic mirror 5 and is thereby directed to the prism 8.

The light of the first and second wavelengths passes through the PBS film 8d of the light 8, and is then shaped into a parallel beam by the collimator lens 4. The light then passes through the quarter-wavelength plate 10 and the diffraction grating 7, and is then focused on the recording surface of the disk D by the condenser lens 11. Here, the diffraction grating 7 varies the focus position of the light of the first and second wavelengths according to the type of disk D.

The light of the first and second wavelengths reflected from the disk D passes through the diffraction grating 7, the quarter-wavelength plate 10, and the collimator lens 4, and then enters the prism 8. Now, the light of the first and second wavelengths has passed through the quarter-wavelength plate 10 twice, and thus has been converted into S-polarized light. In the prism 8, the PBS film 8d reflects the S-polarized light, and the BS film 8e reflects part of the light and transmits the remainder thereof.

The light of the first and second wavelengths that has exited from the prism 8 is received by the light-receiving devices 12 and 13, respectively. In this way, from different types of disk D, signals of the corresponding wavelengths can be read by being received by the light-receiving devices 12 and 13.

In the optical pickup constructed as described above, large wavefront aberration in the light that passes through optical thin films, namely the PBS film 8d and the BS film 8e of the prism 8, leads to erroneous recognition of signals. To avoid this, in an optical pickup for use with a CD-ROM or DVD-ROM as the disk D, wavefront aberration is restricted to, for example, within 50 mλ rms.

However, in an optical system for a next-generation DVD, Blu-ray disk, or the like, reading and writing of signals are achieved by the use of blue laser light of wavelengths of 420 nm or shorter (in the 405 nm band). Thus, even wavefront aberration of about 50 mλ rms results in a high incidence of erroneous recognition. Accordingly, the wavefront aberration in the light that passes through optical thin films, namely the PBS film 8d and the BS film 8e, is required to be, for example, within 25 mλ rms.

To achieve this, the last step of the fabrication process of the prism 8 is dedicated to inspection whereby wavefront aberration is measured. In this inspection step, prisms with wavefront aberration larger than 25 mλ rms are rejected as defective, and, inconveniently, this has been keeping the yields of the prism 8 and the optical pickup 1 low.

SUMMARY OF THE INVENTION

An object of the present invention is to provide a method for fabricating a prism and a method for fabricating an optical system which help increase the yields of a prism through which blue light is passed and of an optical systems that employs such a prism.

To achieve the above object, according to one aspect of the present invention, a method for fabricating a prism that comprises a first and a second substrate, both translucent, bonded together with an optical thin film interposed at the interface in between and that is used with the interface inclined relative to the optical axis of incident laser light of a wavelength of 420 nm or shorter includes the step of: bonding together the first and second substrates of which the difference ΔN1 in refractive index at the wavelength of the laser light fulfills the following condition:

$$\Delta N1 \leqq |1/(0.3\times10^4\times NA\times t)| \quad (1)$$

where t represents the thickness of the first and second substrates cemented together as measured along the optical axis of the laser light; and NA represents the numerical aperture of the incident laser light.

With this method, the refractive indices of the first and second substrates for laser light of wavelengths of 420 nm or shorter are measured, for example, on all candidates for the first and second substrates. Next, the refractive indices of the first and second substrates are compared so that such candidates for them of which the difference ΔN1 in refractive index fulfills the relationship defined by formula (1) above are combined together. The thus combined first and second substrates are bonded together with adhesive or the like. The refractive indices need not be measured on all candidates for the first and second substrates; instead, random inspection may be performed on a lot-by-lot basis. In a case where the refractive indices of the first and second substrates involve only small variations, their measurement may be omitted.

In the above-described method for fabricating a prism, in a case where the prism further comprises a third substrate that is bonded to the second substrate with an optical thin film interposed at the interface in between, the method may further include the step of: bonding together the second and third substrates of which the difference ΔN2 in refractive index at the wavelength of the laser light fulfills the following condition:

$$\Delta N2 \leqq |1/(0.3\times10^4\times NA\times t)| \quad (2)$$

With this method, the refractive indices of the second and third substrates for laser light of wavelengths of 420 nm or shorter are measured, for example, on all candidates for the second and third substrates. Next, the refractive indices of the second and third substrates are compared so that such candidates for them of which the difference ΔN2 in refractive index fulfills the relationship defined by formula (2) above are combined together. The thus combined second and third substrates are bonded together with adhesive or the like.

According to another aspect of the present invention, a method for fabricating a prism that comprises a first and a second substrate, both translucent, bonded together with an optical thin film interposed at the interface in between and that is used with the interface inclined relative to the optical axis of incident laser light of a wavelength of 420 nm or shorter, includes the step of: bonding together the first and second substrates of which the difference in refractive index at the wavelength of the laser light is 1/300 or smaller.

With this method, the refractive indices of the first and second substrates for laser light of wavelengths of 420 nm or shorter are measured, for example, on all candidates for the first and second substrates. Next, the refractive indices of the first and second substrates are compared so that such candidates for them of which the difference in refractive index is 1/300 or smaller are combined together. The thus combined first and second substrates are bonded together with adhesive or the like.

In the above-described method for fabricating a prism, in a case where the prism further comprises a third substrate that is bonded to the second substrate with an optical thin film interposed at the interface in between, the method may further include the step of: bonding together the second and third substrates of which the difference in refractive index at the wavelength of the laser light is 1/300or smaller.

With this method, the refractive indices of the second and third substrates for laser light of wavelengths of 420 nm or shorter are measured, for example, on all candidates for the second and third substrates. Next, the refractive indices of the second and third substrates are compared so that such candidates for them of which the difference in refractive index is 1/300 or smaller are combined together. The thus combined second and third substrates are bonded together with adhesive or the like.

According to another aspect of the present invention, a method for fabricating a prism that comprises a first and a second substrate, both translucent, bonded together with an optical thin film interposed at the interface in between and that is used with the interface inclined relative to the optical axis of incident laser light of a wavelength of 420 nm or shorter, includes the step of: bonding together the first and second substrates of which the difference in refractive index at the wavelength of the laser light is 1/1500 or smaller.

With this method, the refractive indices of the first and second substrates for laser light of wavelengths of 420 nm or shorter are measured, for example, on all candidates for the first and second substrates. Next, the refractive indices of the first and second substrates are compared so that such candidates for them of which the difference in refractive index is 1/1500 or smaller are combined together. The thus combined first and second substrates are bonded together with adhesive or the like.

In the above-described method for fabricating a prism, in a case where the prism further comprises a third substrate that is bonded to the second substrate with an optical thin film interposed at the interface in between, the method may further include the step of: bonding together the second and third substrates of which the difference in refractive index at the wavelength of the laser light is 1/1500 or smaller.

With this method, the refractive indices of the second and third substrates for laser light of wavelengths of 420 nm or shorter are measured, for example, on all candidates for the second and third substrates. Next, the refractive indices of the second and third substrates are compared so that such candidates for them of which the difference in refractive index is 1/1500 or smaller are combined together. The thus combined second and third substrates are bonded together with adhesive or the like.

According to another aspect of the present invention, a method for fabricating an optical system comprising a light source that emits laser light of a wavelength of 420 nm or shorter and a prism that comprises a first and a second substrate, both translucent, bonded together with an optical thin film interposed at the interface in between and that is used with the interface inclined relative to the optical axis of incident laser light of a wavelength of 420 nm or shorter includes the step of: bonding together the first and second substrates of which the difference ΔN1 in refractive index at the wavelength of the laser light fulfills the following condition:

$$\Delta N1 \leqq |1/(0.3\times10^4\times NA\times t)|$$

where t represents the thickness of the first and second substrates cemented together as measured along the optical axis of the laser light; and NA represents the numerical aperture of the incident laser light.

In the above-described method for fabricating an optical system, in a case where the prism further comprises a third substrate that is bonded to the second substrate with an optical thin film interposed at the interface in between, the method may further comprise the step of: bonding together the second and third substrates of which the difference ΔN2 in refractive index at the wavelength of the laser light fulfills the following condition:

$$\Delta N2 \leqq |1/(0.3\times10^4\times NA\times t)| \quad (2)$$

According to another aspect of the present invention, a method for fabricating an optical system comprising a light source that emits laser light of a wavelength of 420 nm or shorter and a prism that comprises a first and a second substrate, both translucent, bonded together with an optical thin film interposed at the interface in between and that is used with the interface inclined relative to the optical axis of incident laser light of a wavelength of 420 nm or shorter includes the step of: bonding together the first and second substrates of which the difference in refractive index at the wavelength of the laser light is 1/300 or smaller.

In the above-described method for fabricating an optical system, in a case where the prism further comprises a third substrate that is bonded to the second substrate with an optical thin film interposed at the interface in between, the method may further include the step of: bonding together the second and third substrates of which the difference in refractive index at the wavelength of the laser light is 1/300 or smaller.

According to another aspect of the present invention, a method for fabricating an optical system comprising a light source that emits laser light of a wavelength of 420 nm or shorter and a prism that comprises a first and a second substrate, both translucent, bonded together with an optical thin film interposed at the interface in between and that is used with the interface inclined relative to the optical axis of incident laser light of a wavelength of 420 nm or shorter includes the step of: bonding together the first and second substrates of which the difference in refractive index at the wavelength of the laser light is 1/1500 or smaller.

In the above-described method for fabricating an optical system, in a case where the prism further comprises a third substrate that is bonded to the second substrate with an optical thin film interposed at the interface in between, the method may further include the step of: bonding together the second and third substrates of which the difference in refractive index at the wavelength of the laser light is 1/1500 or smaller.

In the above-described method for fabricating a prism or optical system, the optical thin film may be one of a polarizing beam splitter film, a beam splitter film, a dichroic film, an anti-reflection film, and a total-reflection film.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
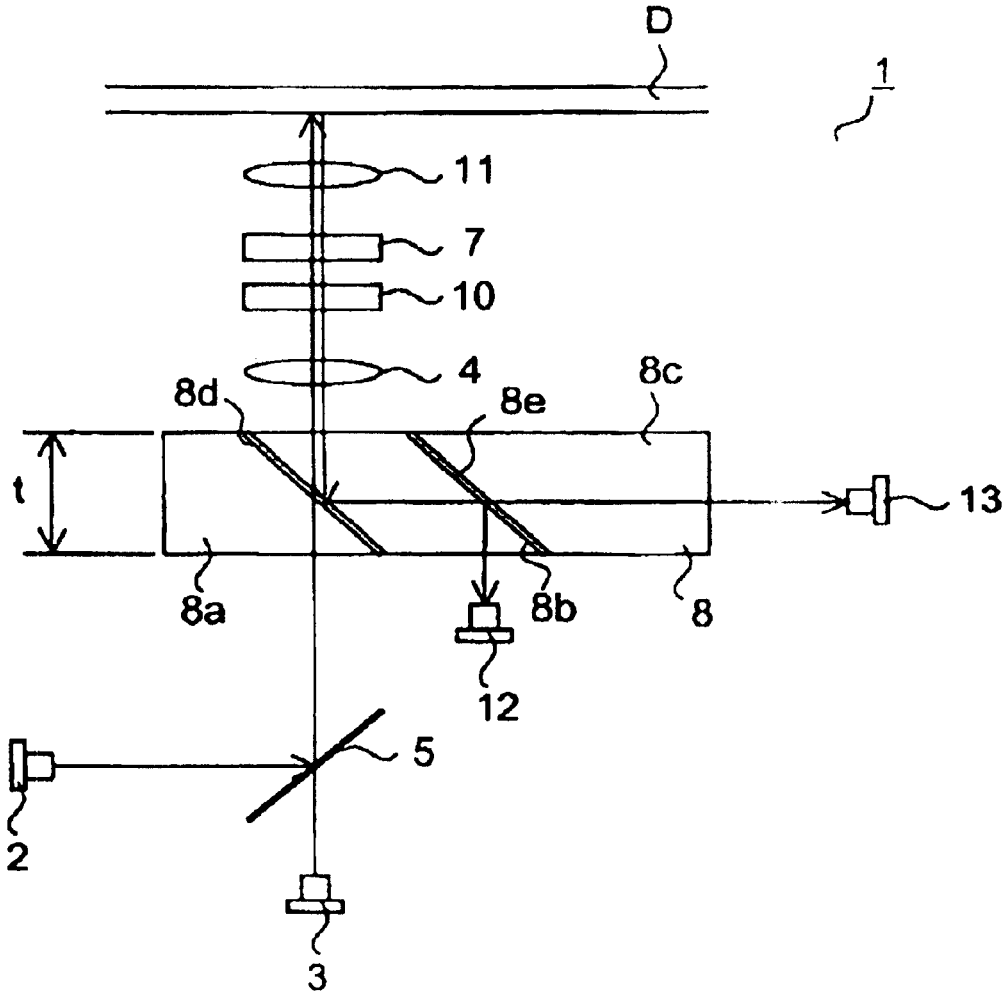
FIG. 1 is a diagram showing the construction of an optical pickup.

Hereinafter, an embodiment of the present invention will be described with reference to the drawings. In this embodiment, an optical pickup constructed as shown in FIG. 1 described earlier is used. The wavelength (first wavelength) of the light emitted from the first light source 2 is in the 405 nm band, and the wavelength (second wavelength) of the light emitted from the second light source 3 is in the 650 nm band.

Thus, when the disk D is a next-generation DVD, blu-ray disk, or the like, reading and writing of signals are achieved by the use of the light emitted from the first light source 2, and, when the disk D is a DVD-ROM, reading and writing of signals are achieved by the use of the light emitted from the second light source 3. A third light source may additionally be provided to permit writing and reading of signals to and from a CD-ROM or the like.

Figure 2:
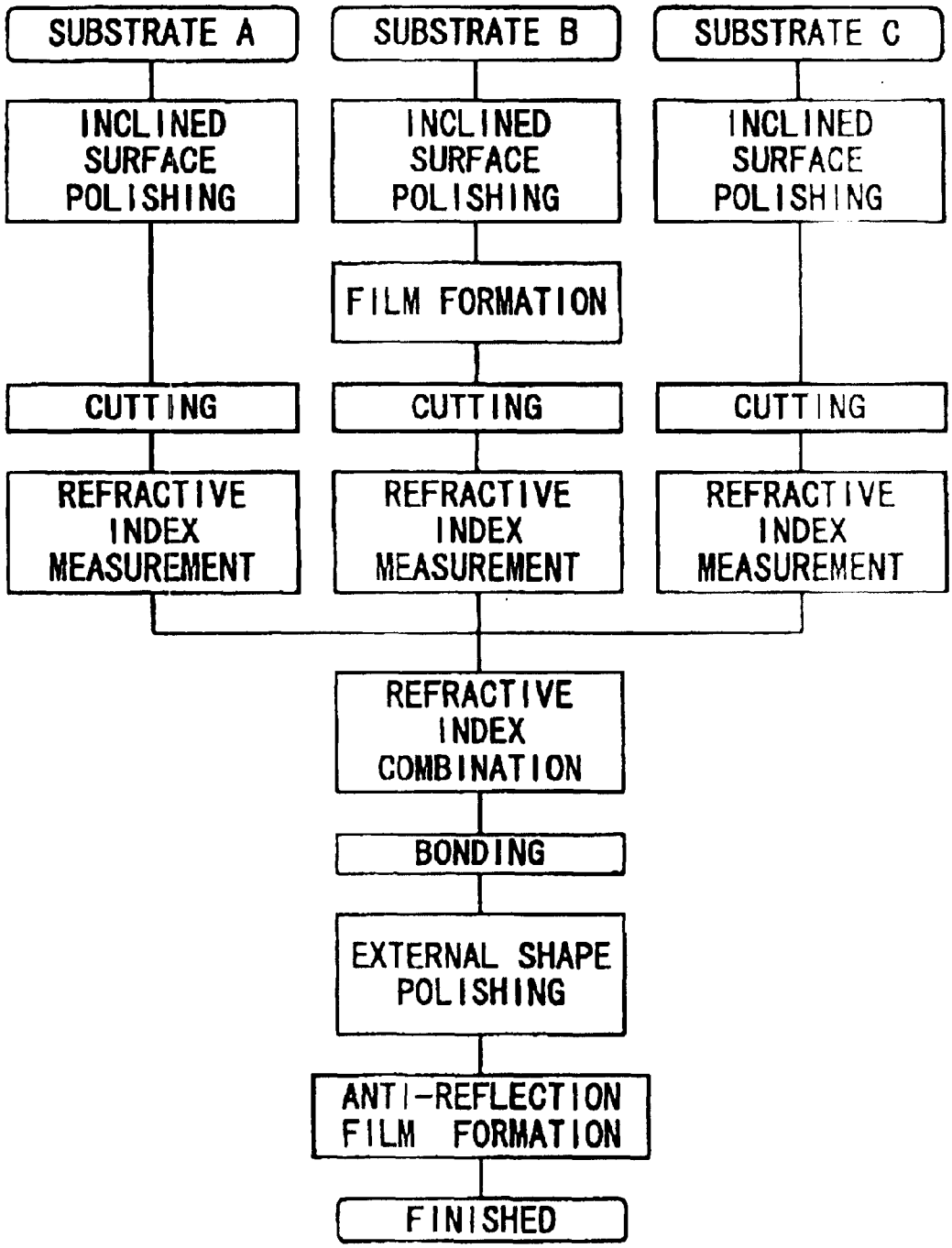
FIG. 2 is a diagram showing a process of fabricating a prism according to the present invention.

FIG. 2 is a process diagram showing the process for fabricating the prism 8 of the optical pickup 1. As described earlier, the prism 8 is composed of substrates 8a, 8b, and 8c (in FIG. 2, referred to as substrates A, B, and C, respectively) bonded together. The substrates are each made of a translucent material, for example glass such as SK10 or resin.

The substrates 8a and 8c are formed by similar processes, specifically each in the following manner. First, in the step of polishing the inclined surface, one face of a plate-shaped member which will be used as the inclined surface is polished to a predetermined surface roughness and flatness by lapping or polishing. Next, in the step of cutting, the plate-shaped member is cut with a slicer or the like so as to have a trapezoidal sectional shape as shown in FIG. 1. Next, in the step of measuring the refractive index, the substrate 8a or 8c is irradiated with blue light of a wavelength of 405 nm to measure its refractive index.

On the other hand, the substrate 8b is formed in the following manner. First, in the step of polishing the inclined surface, two opposite faces of a plate-shaped member which will be used as the inclined surfaces are polished to a predetermined surface roughness and flatness. Next, in the step of forming films, a PBS film 8d is formed on one of those faces, and a BS film 8e is formed on the other. Next, in the step of cutting, the plate-shaped member is cut with a slicer or the like so as to have a parallelogrammatic sectional shape as shown in FIG. 1. Next, in the step of measuring the refractive index, the substrate 8b is irradiated with blue light of a wavelength of 405 nm to measure its refractive index.

After the measurement of the refractive indices of the substrates 8a, 8b, and 8c, next, in the step of combining appropriate refractive indices, the substrate 8b is combined with such candidates for the substrates 8a and 8c of which the difference in refractive index from that of the substrate 8b is 1/1500 or smaller. Next, in the step of bonding, the substrates 8a, 8b, and 8c thus paired together are bonded together at their respective inclined surfaces with ultraviolet-curing resin or the like.

Next, in the step of polishing the external shape, of all the faces of the substrates 8a, 8b, and 8c thus bonded together, the two that are parallel to the disk D and the one that faces the light-receiving device 13 are polished to a predetermined surface roughness and flatness by lapping and polishing. Next, in the step of forming anti-reflection films, anti-reflection films are formed on the two faces that are parallel to the disk D. In this way, the prism 8 is fabricated.

Figure 3:
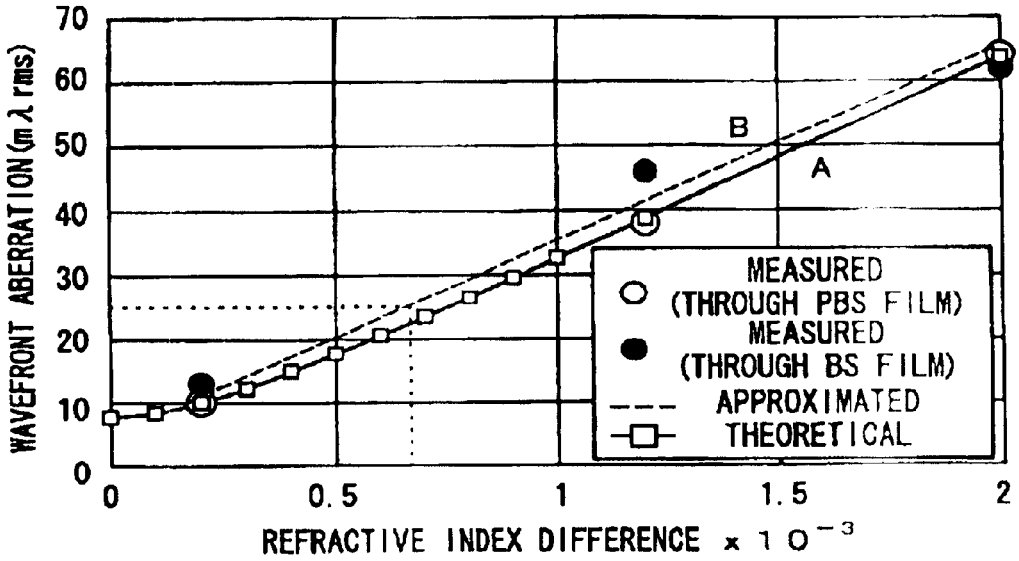
FIG. 3 is a diagram showing the characteristics of a prism fabricated by a process of fabricating a prism according to the present invention.

FIG. 3 is a diagram showing the results of measurement of the wavefront aberration observed with the prism 8 fabricated by the fabrication process described above. Along the vertical axis is taken the wavefront aberration (in mλ rms), and along the horizontal axis is taken the difference in refractive index of the substrates 8a, 8b, and 8c. The thickness t (see FIG. 1) of the prism 8 is 2.67 mm. The substrates 8a, 8b, and 8c are all made of SK10. The numerical aperture AN of the light incident on the prism 8 is 0.15.

In the figure, white circles indicate the wavefront aberration occurring in the light that passes through the substrates 8a and 8b in the direction of the thickness t (see FIG. 1) by way of the PBS film 8d, and black circles indicate the wavefront aberration occurring in the light that passes through the substrates 8b and 8c in the direction of the thickness t by way of the BS film 8e. For comparison, line B (a broken line) indicates the approximated values for cases where the differences in refractive index are 1/500 and 1/830. Moreover, curve A indicates the theoretical values of the simulated wavefront aberration.

This figure shows that, by combining together and bonding together substrates 8a, 8b, and 8c of which the difference in refractive index is 1/1500 or smaller, it is possible to restrict the wavefront aberration to 22 mλ rms or smaller on a theoretical value basis, and to 25 mλ rms or smaller on an actually measured (approximated) value basis. Thus, it is possible to reduce the number of defective prisms with wavefront aberration larger than 25 mλ rms and thereby improve the yield of the prism 8.

Moreover, by limiting the difference in refractive index of the substrates 8a, 8b, and 8c to 1/3000 or smaller, it is possible to restrict the wavefront aberration to 12 mλ rms or smaller on a theoretical value basis, and to 15 mλ rms or smaller on an actually measured value basis. Thus, in the step of combining appropriate refractive indices, by combining the substrate 8b with such candidates for the substrates 8a and 8c as are sorted out as having a difference of 1/3000 or smaller in refractive index, it is possible to further reduce the number of defective prisms with wavefront aberration larger than 25 mλ rms and thereby improve the yields of the prism 8 and the optical pickup 1.

Furthermore, by limiting the difference in refractive index of the substrates 8a, 8b, and 8c to 1/10000 or smaller, it is possible to restrict the wavefront aberration to 10 mλ rms or smaller both on a theoretical value basis and on an actually measured value basis. Therefore, in the step of combining appropriate refractive indices, it is more preferable to combine the substrate 8b with such candidates for the substrates 8a and 8c as are sorted out as having a difference of 1/10000 or smaller in refractive index.

In this embodiment, in the step of measuring the refractive indices, the refractive indices of the substrates 8a, 8b, and 8c are measured on all candidates for them. However, it is not absolutely necessary to measure the refractive indices of all candidates so long as, in the step of bonding, the substrates 8a and 8b are combined together so as to have a difference of 1/1500 in refractive index and the substrates 8b and 8c are combined together so as to have a difference of 1/1500 in refractive index. For example, in a case where variations in refractive index are small within each individual plate-shaped member, random inspection may be performed instead on a lot-by-lot basis by subjecting, of all the substrates obtained from a single plate-shaped member, only a predetermined number to refractive index measurement. In a case where substrates obtained from a single plate-shaped member within which variations in refractive index are small are combined together, or in a case where variations in refractive index are small in all plate-shaped members, it is possible to omit the measurement of the refractive indices of the substrates.

In FIG. 3 described above, the theoretical values obtained through simulation contain spherical aberration that occurs when rays are incident on the prism 8. This makes the theoretical values coincident with the actually measured values. As shown in the figure, the spherical aberration prevents the wavefront aberration from becoming zero even when the difference in refractive index of the substrates 8a, 8b, and 8c is made zero.

Figure 4:
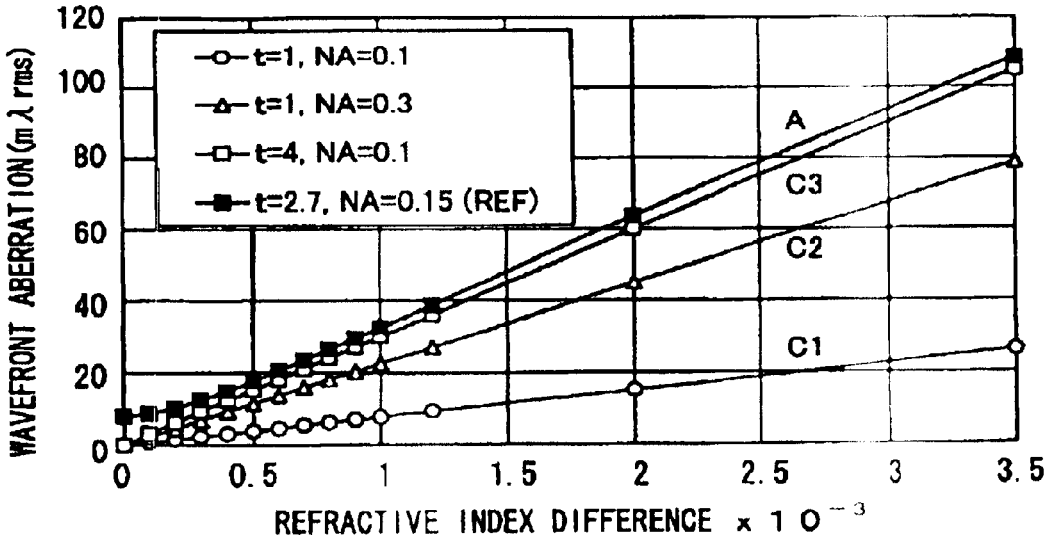
FIG. 4 is a diagram illustrating the conditions by which the substrates are sorted out in a process of fabricating a prism according to the present invention.

However, with an optical system free from spherical aberration, it is possible to further reduce the wavefront aberration by reducing the difference in refractive index of the substrates 8a, 8b, and 8c. FIG. 4 shows the theoretical values of the wavefront aberration occurring in the light that passes through the substrates 8a and 8b as simulated in an optical system free from spherical aberration. Along the vertical axis is taken the wavefront aberration (in mλ rms), and along the horizontal axis is taking the difference in refractive index of the substrates.

The thickness t of the substrates 8a and 8b along the optical axis of the light incident thereon and the numerical aperture NA of the light incident on the substrates 8a and 8b are t=1 mm and NA=0.1 in the case indicated by line C1, t=1 mm and NA=0.3 in the case indicated by line C2, and t=4 mm and NA=0.1 in the case indicated by line C3. For comparison, the simulated values (A) shown in FIG. 3 described above are shown together.

The wavefront aberration AS (mλ rms) is proportional to the difference ΔN1 in refractive index of the substrates 8a and 8b, the numerical aperture NA of the incident light, and the thickness t (mm) of the substrates 8a and 8b along the optical axis of the incident light, and is thus given by formula (3) below. Accordingly, to restrict the wavefront aberration AS to 25 mλ rms or smaller, the relationship defined by formula (4) below needs to be fulfilled. Thus, in the step of combining appropriate refractive indices (see FIG. 2), by combining the substrates 8a and 8b so that they fulfill the relationship defined by formula (4), it is possible to restrict the wavefront aberration AS to 25 mλ rms or smaller.

Incidentally, the light incident on the prism 8 may have its numerical aperture NA converted by an NA conversion lens or the like.

$$AS=7.5\times10^4\times\Delta N1\times NA\times t) \quad (3)$$

$$\Delta N1\leqq|1/(0.3\times10^4\times NA\times t)| \quad (4)$$

The difference ΔN2 in refractive index of the substrates 8b and 8c can be defined in a similar manner. Here, the light that passes through the substrates 8b and 8c is perpendicular to the optical axis of the light incident on the prism 8 (see FIG. 1). The smaller the effective diameter of light passing through a given medium, the smaller the wavefront aberration, and therefore the wavefront aberration in the light passing through the substrates 8b and 8c is smaller than that in the light passing through the substrates 8a and 8b. On the other hand, making the substrates 8a and 8c common components helps reduce the number of fabrication steps.

For these reasons, by defining the difference ΔN2 in refractive index of the substrates 8b and 8c by the use of the thickness t of the substrates 8b and 8c along the optical axis of the light incident thereon as it appears in formula (4), it is possible to define the difference ΔN2 under stricter conditions and to make the substrates 8a and 8c common components. Thus, in the step of combining appropriate refractive indices (see FIG. 2), by combining the substrates 8b and 8c so that they fulfill the relationship defined by formula (5), it is possible to restrict the wavefront aberration AS occurring in the light passing through the substrates 8b and 8c to 25 mλ rms or smaller.

$$\Delta N2\leqq|1/(0.3\times10^4\times NA\times t)| \quad (5)$$

In the optical system of a pickup optical system designed for use in the 405 nm band as currently assumed, the numerical aperture NA of the light incident on the prism 8 is about 0.1 to 0.4, and the thickness t of the prism 8 is about 1.0 to 4.0 mm. The upper limit of wavefront aberration permitted in such an optical system is in the range from 5 to 25 mλ rms, though it depends on the detection system configuration, the targeted system design, and other factors.

Suppose, for example, that the prism 8 is fabricated so that the difference ΔN1 in refractive index of the substrates 8a and 8b and the difference ΔN2 in refractive index of the substrates 8b and 8c are both 1/300 or smaller. When this prism 8 is incorporated in an optical system where NA=0.3 and t=1 mm, the maximum value of the produced wavefront aberration is 75 mλ rms on a theoretical value basis. Thus, here, the prism 8 cannot be used.

By contrast, when the same prism 8 is incorporated in an optical system where NA=0.1 and t=1 mm, the produced wavefront aberration is 25 mλ rms or smaller on a theoretical value basis. Thus, here, the prism 8 can be used. In this way, by limiting the difference ΔN1 in refractive index of the substrates 8a and 8b and the difference ΔN2 in refractive index of the substrates 8b and 8c both to 1/300 or smaller, it is possible to obtain an optical system for a pickup optical system that produces wavefront aberration of 25 mλ rms or smaller. If either of the differences ΔN1 and ΔN2 in refractive index is larger than 1/300, the produced wavefront aberration is larger than 25 mλ rms so long as the numerical aperture NA of the light incident on the prism and the thickness t of the prism are in the ranges currently assumed.

When the prism 8 is fabricated so that the difference ΔN1 in refractive index of the substrates 8a and 8b and the difference ΔN2 in refractive index of the substrates 8b and 8c are both 1/400 or smaller, and this prism 8 is incorporated in an optical system where NA=0.1 and t=1 mm, it is possible to reduce the produced wavefront aberration to 20 mλ rms or smaller on a theoretical value basis. In this way, it is possible to obtain an optical system for a pickup optical system that produces wavefront aberration of 20 mλ rms or smaller. Incidentally, in an optical system where NA=0.13 and t=1 mm, or in an optical system where NA=0.1 and t=1.3 mm, it is possible to reduce the produced wavefront aberration to 25 mλ rms or smaller on a theoretical value basis.

When the prism 8 is fabricated so that the difference ΔN1 in refractive index of the substrates 8a and 8b and the difference ΔN2 in refractive index of the substrates 8b and 8c are both 1/300 or smaller, and this prism 8 is incorporated in an optical system where NA=0.1 and t=1 mm, it is possible to reduce the produced wavefront aberration to 15 mλ rms or smaller on a theoretical value basis. In this way, it is possible to obtain an optical system for a pickup optical system that produces wavefront aberration of 15 mλ rms or smaller. Incidentally, in an optical system where NA=0.17 and t=1 mm, or in an optical system where NA=0.1 and t=1.7 mm, it is possible to reduce the produced wavefront aberration to 25 mλ rms or smaller on a theoretical value basis.

When the prism 8 is fabricated so that the difference ΔN1 in refractive index of the substrates 8a and 8b and the difference ΔN2 in refractive index of the substrates 8b and 8c are both 1/1500 or smaller, and this prism 8 is incorporated in an optical system where NA=0.1 and t=1 mm, it is possible to reduce the produced wavefront aberration to 5 mλ rms or smaller on a theoretical value basis. In this way, it is possible to obtain an optical system for a pickup optical system that produces wavefront aberration of 5 mλ rms or smaller. Incidentally, in an optical system where NA=0.25 and t=2 mm, or in an optical system where NA=0.2 and t=2.5 mm, it is possible to reduce the produced wavefront aberration to 25 mλ rms or smaller on a theoretical value basis.

As described above, the difference in refractive index of the substrates is selected appropriately from among the results of simulation according to the permitted wavefront aberration on the basis of the actually used system configuration and the required accuracy.

Figure 5:
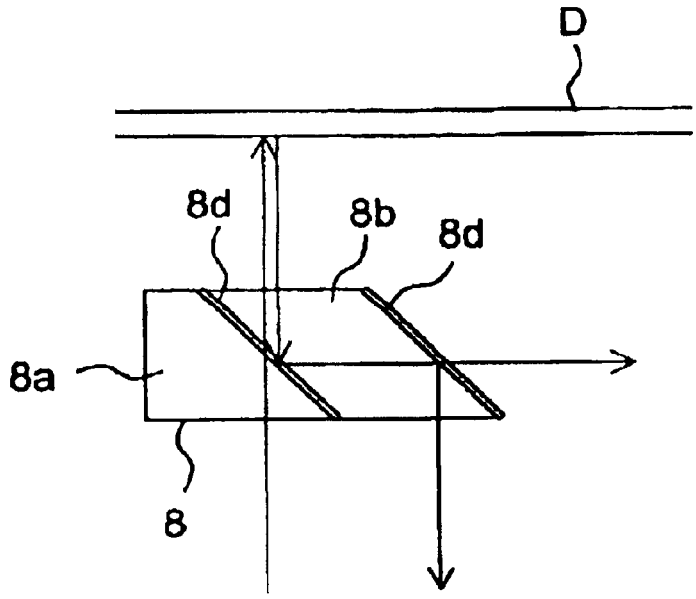
FIG. 5 is a diagram showing another prism used in an optical pickup.
Figure 6:
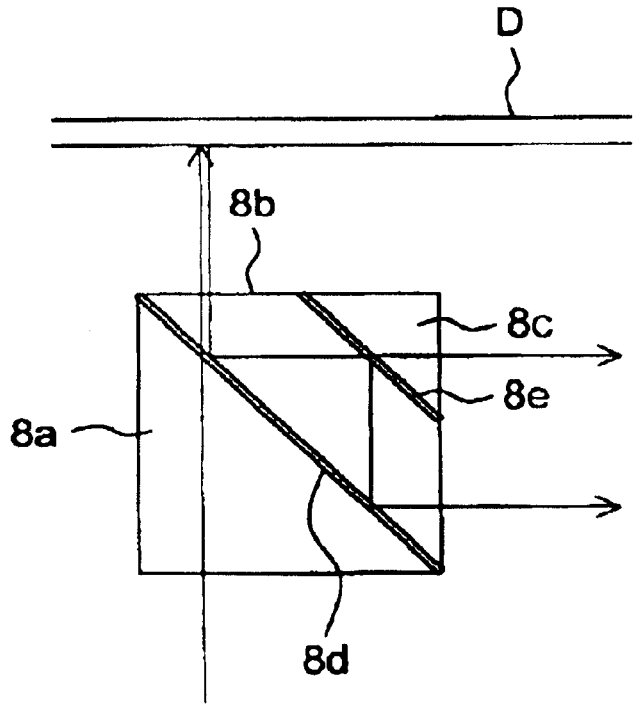
FIG. 6 is a diagram showing still another prism used in an optical pickup.

The prism 8 may be given any other shape than the one shown in FIG. 1. For example, as shown in FIG. 5, it is possible to form it by bonding together only the substrates 8a and 8b, with the substrate 8c (see FIG. 1) omitted. Alternatively, as shown in FIG. 6, it is possible to increase the thickness of the substrates 8a and 8b in the direction perpendicular to the disk D so that the light of the first and second wavelengths is emitted in the same direction so as to be received by the light-receiving devices 12 and 13 (see FIG. 1).

The embodiment described above deals with an optical pickup that employs a prism designed for use in the 405 nm wavelength band. However, it is also possible to achieve the same advantages in an optical system incorporating an optical pickup that employs a prism designed for use with light beam of wavelengths of 420 nm or shorter with variations in the wavelength of the light source taken into consideration.

The embodiment described above deals with a prism 8 having optical thin films, namely the PBS film 8d and the BS film 8e. However, it is also possible to achieve the same advantages with a prism having an optical thin film of any other type. For example, as an optical thin film, it is possible to use an anti-reflection film, total-reflection film, half-mirror film, dichroic film, or the like.

What is claimed is:

1. A method for fabricating a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference ΔN1 in refractive index at the wavelength of the laser light fulfills the following condition:

$$\Delta N1 \leqq |1/(0.3\times10^4\times NA\times t)|$$

where t represents a thickness of the first and second substrates cemented together as measured along the optical axis of the laser light; and NA represents a numerical aperture of the incident laser light.

2. A method for fabricating a prism as claimed in claim 1, the prism further comprising a third substrate that is bonded to the second substrate with an optical thin film interposed at an interface in between, the method further comprising the step of:

bonding together the second and third substrates of which a difference ΔN2 in refractive index at the wavelength of the laser light fulfills the following condition:

$$\Delta N2 \leqq |1/(0.3\times10^4\times NA\times t)|.$$

3. A method for fabricating a prism as claimed in claim 1, wherein the optical thin film is one of a polarizing beam splitter film, a beam splitter film, a dichroic film, an anti-reflection film, and a total-reflection film.

4. A method for fabricating a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference in refractive index at the wavelength of the laser light is 1/300 or smaller.

5. A method for fabricating a prism as claimed in claim 4, the prism further comprising a third substrate that is bonded to the second substrate with an optical thin film interposed at an interface in between, the method further comprising the step of:

bonding together the second and third substrates of which a difference in refractive index at the wavelength of the laser light is 1/300 or smaller.

6. A method for fabricating a prism as claimed in claim 4, wherein the optical thin film is one of a polarizing beam splitter film, a beam splitter film, a dichroic film, an anti-reflection film, and a total-reflection film.

7. A method for fabricating a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference in refractive index at the wavelength of the laser light is 1/1500 or smaller.

8. A method for fabricating a prism as claimed in claim 7, the prism further comprising a third substrate that is bonded to the second substrate with an optical thin film interposed at an interface in between, the method further comprising the step of:

bonding together the second and third substrates of which a difference in refractive index at the wavelength of the laser light is 1/1500 or smaller.

9. A method for fabricating a prism as claimed in claim 7, wherein the optical thin film is one of a polarizing beam splitter film, a beam splitter film, a dichroic film, an anti-reflection film, and a total-reflection film.

10. A method for fabricating an optical system comprising a light source that emits laser light of a wavelength of 420 nm or shorter and a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference ΔN1 in refractive index at the wavelength of the laser light fulfills the following condition:

$$\Delta N1 \leqq |1/(0.3\times10^4\times NA\times t)|$$

where t represents a thickness of the first and second substrates cemented together as measured along the optical axis of the laser light; and NA represents a numerical aperture of the incident laser light.

11. A method for fabricating an optical system as claimed in claim 10, the prism further comprising a third substrate that is bonded to the second substrate with an optical thin film interposed at an interface in between, the method further comprising the step of:

bonding together the second and third substrates of which a difference ΔN2 in refractive index at the wavelength of the laser light fulfills the following condition:

$$\Delta N2 \leqq |1/(0.3\times10^4\times NA\times t)|.$$

12. A method for fabricating an optical system as claimed in claim 10, wherein the optical thin film is one of a polarizing beam splitter film, a beam splitter film, a dichroic film, an anti-reflection film, and a total-reflection film.

13. A method for fabricating an optical system comprising a light source that emits laser light of a wavelength of 420 nm or shorter and a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference in refractive index at the wavelength of the laser light is 1/300 or smaller.

14. A method for fabricating an optical system as claimed in claim 13, the prism further comprising a third substrate that is bonded to the second substrate with an optical thin film interposed at an interface in between, the method further comprising the step of:

bonding together the second and third substrates of which a difference in refractive index at the wavelength of the laser light is 1/300 or smaller.

15. A method for fabricating an optical system as claimed in claim 13, wherein the optical thin film is one of a polarizing beam splitter film, a beam splitter film, a dichroic film, an anti-reflection film, and a total-reflection film.

16. A method for fabricating an optical system comprising a light source that emits laser light of a wavelength of 420 nm or shorter and a prism that comprises a first and a second substrate, both translucent, bonded together with an optical thin film interposed at an interface in between and that is used with the interface inclined relative to an optical axis of incident laser light of a wavelength of 420 nm or shorter, comprising the step of:

bonding together the first and second substrates of which a difference in refractive index at the wavelength of the laser light is $1/1500$ or smaller.

17. A method for fabricating an optical system as claimed in claim 16, the prism further comprising a third substrate that is bonded to the second substrate with an optical thin film interposed at an interface in between, the method further comprising the step of:

bonding together the second and third substrates of which a difference in refractive index at the wavelength of the laser light is $1/1500$ or smaller.

18. A method for fabricating an optical system as claimed in claim 16, wherein the optical thin film is one of a polarizing beam splitter film, a beam splitter film, a dichroic film, an anti-reflection film, and a total-reflection film.

*19. A method for fabricating a prism for use in an optical pickup, the prism comprising a first and a second substrate, both translucent, bonded together with an optical thin film interposed at an interface in between and being used with the interface inclined relative to an optical axis of incident laser light of a wavelength of 420 nm or shorter, the method comprising the steps of:*

*combining together the first and second substrates, which have been sorted according to refractive indices thereof, such that a difference ΔN1 between refractive indices of the first and second substrates fulfills the formula below; and*

*cementing together the first and second substrates thus combined together,*

*the formula being*

$$\Delta N1 \leqq |1/(0.3\times10^4\times NA\times t)|$$

*where:*

*t represents a thickness of the first and second substrates cemented together as measured along the optical axis of the laser light; and*

*NA represents a numerical aperture of the incident laser light.*

*20. A method for fabricating a prism as claimed in claim 19, further comprising the step of sorting the first substrate and the second substrate according to refractive indices thereof.*

*21. A method for fabricating a prism for use in an optical pickup, the prism comprising a first and a second substrate, both translucent, bonded together with an optical thin film interposed at an interface in between and being used with the interface inclined relative to an optical axis of incident laser light of a wavelength of 420 nm or shorter, the method comprising the step of:*

*combining together the first and second substrates, which have been sorted according to refractive indices thereof, such that a difference between refractive indices of the first and second substrates equals $1/3{,}000$ or smaller; and*

*cementing together the first and second substrates thus combined together.*

*22. A method for fabricating a prism as claimed in claim 21, wherein the difference in refractive index between the first and second substrates at the wavelength of the laser light is $1/10{,}000$ or smaller.*

*23. A method for fabricating a prism as claimed in claim 21, further comprising the step of sorting the first substrate and the second substrate according to refractive indices thereof.*

*24. A method for fabricating a prism as claimed in claim 22, further comprising the step of sorting the first substrate and the second substrate according to refractive indices thereof.*

*25. A method for fabricating a prism as claimed in claim 19, wherein difference ΔN1 between refractive indices of the first and second substrates at the wavelength of the laser light is $1/10{,}000$ or smaller.*

*26. A method for fabricating a prism for use in an optical pickup, the prism comprising a first and a second substrate, both translucent, bonded together with an optical thin film interposed at an interface in between and being used with the interface inclined relative to an optical axis of incident laser light of a wavelength of 420 nm or shorter, the method comprising the step of:*

*combining together the first and second substrates, which have been sorted according to refractive indices thereof, such that a difference between refractive indices of the first and second substrates is $1/3{,}000$ or smaller; and*

*bonding together the first and second substrates thus combined together.*

*27. A method for fabricating a prism as claimed in claim 26, wherein the difference in refractive index between the first and second substrates at the wavelength of the laser light is $1/10{,}000$ or smaller.*

*28. A method for fabricating a prism as claimed in claim 26, further comprising the step of sorting the first and second substrates according to refractive indices thereof.*

*29. A method for fabricating a prism as claimed in claim 27, further comprising the step of sorting the first and second substrates according to refractive indices thereof.*

*30. A method for fabricating a prism as claimed in claim 26, the prism further comprising a third substrate bonded to the second substrate with an optical thin film interposed at an interface in between, the method further comprising the step of:*

*combining together the second and third substrates, which have been sorted according to refractive indices thereof, such that a difference between refractive indices of the second and third substrate is $1/3{,}000$ or smaller; and*

*bonding together the second and third substrates thus combined together.*

*31. A method for fabricating a prism as claimed in claim 30, further comprising the step of sorting the first, second and third substrates according to refractive indices thereof.*

*32. A method for fabricating a prism as claimed in claim 30, wherein the difference in refractive index between the second and third substrates at the wavelength of the laser light is $1/10{,}000$ or smaller.*

* * * * *